Feb. 9, 1960     H. W. DUTTON, JR     2,924,439
APPARATUS FOR MAKING DISPERSIONS
Filed May 27, 1957

INVENTOR.
H. W. DUTTON JR.
BY
AGENT

United States Patent Office 2,924,439
Patented Feb. 9, 1960

2,924,439

APPARATUS FOR MAKING DISPERSIONS

Hubert W. Dutton, Jr., Newark, Del., assignor to E. I. du Pont de Nemours and Company, Wilmington, Del., a corporation of Delaware Application May 27, 1957, Serial No. 661,723

3 Claims. (Cl. 259—7)

This invention relates to an apparatus for the dispersion of a solid material in a liquid.

It is difficult to make dispersions of certain materials, such as polyvinyl alcohol in water, without having present many gross solid particles or undispersible aggregations of particles which often interfere with the effective use of the dispersion containing these particles. Thus it is often difficult to prepare solutions of polyvinyl alcohol in water because the dispersion which must first be made will have too many lumps or agglomerates which are very difficult to dissolve except at the cost of much time and energy which for many large applications makes this a prohibitively expensive operation.

A special difficulty associated with particulate forms of polyvinyl alcohol is the tendency to agglomerate when first contacting the water and then these agglomerates take excessively long times to go into solution even in hot water. Another difficulty with polyvinyl alcohol is the fact that as solution takes place in water the aqueous layer surrounding the dissolving particles becomes very viscous and groups of particles agglomerate. These agglomerates do not dissolve readily and the common methods of dispersion using paddles, propellers and the like are not sufficiently effective in dispersing them.

Accordingly it is a major object of the present invention to provide an apparatus in which a fine dispersion of a solid, such as polyvinyl alcohol, can be made in a dispersant such as water without being accompanied by the presence of undispersed solid particles or lumps. It is also an object to provide an inexpensive device in which the dispersion of a solid in liquid can be prepared, preferably in a continuous operation.

These and other objectives related to an apparatus for the dispersion of a particulate solid in a liquid are now accomplished by providing a novel disperser comprising a vertical cylinder open at the top for feeding the solid to be dispersed and equipped with suitable inlet for the liquid, a set of at least three disk type impellers mounted in spaced relation to each other on a shaft extending axially into said cylinder, the shaft being adapted to rotate said disks at the speed necessary to impart the required dispersing action to the mixture and an outlet for withdrawing the dispersion or slurry from or near the bottom of said cylinder.

Figure 4:
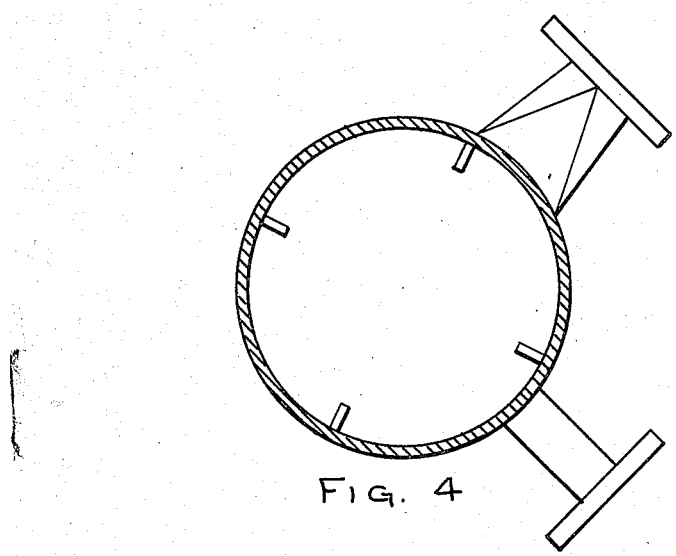
Figure 3:
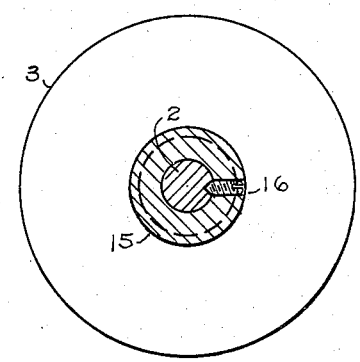
Figure 2:
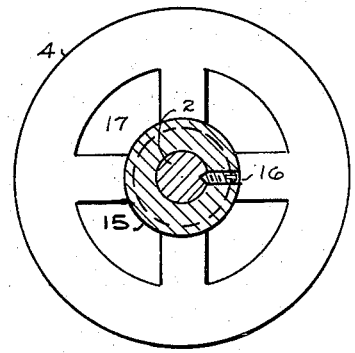
Figure 1:
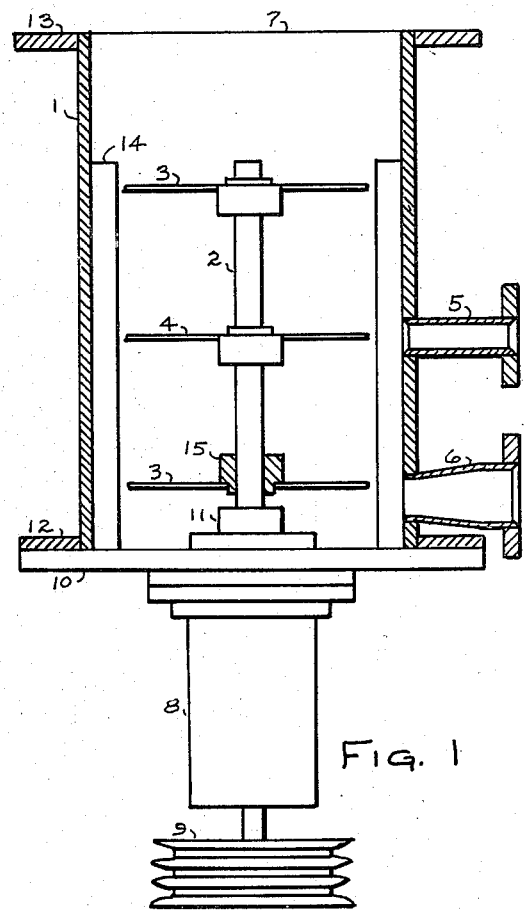

The present invention is further explained by a consideration of the drawings of which:

Figure 1 is a vertical sectional view of the disperser.
Figure 2 is a plan view of one type of open disk impeller.
Figure 3 is a plan view of closed type of disk impeller.
Figure 4 is a plan view of the disperser of Figure 1 but with inlet and outlet shown at right angle.

All numbers in the figures refer to the same element in the apparatus illustrated.

By way of example, the apparatus of my invention comprises a vertical cylindrical vessel 1 open at the top and provided with flange 13 if desired. Shaft 2 enters the vessel from the bottom through base flange 10 and is sealed as at 11 to prevent leakage of liquid into the shaft bearing housing 8. On shaft 2 there are mounted three disks which act as impellers. Top and bottom impellers or disks 3 are solid or closed, having no perforations in their flat exposed surfaces whereas the middle disk 4 is provided with openings 17 or perforations preferably as shown in Figure 2. Dispersing liquid enters the disperser by way of inlet 5 and the dispersion leaves by way of outlet 6. The particulate solid is fed into the disperser from the top opening 7. The housing 8 contains the bearing for shaft 2 and the shaft is rotatable as by sheave 9. Shaft and bearing housing are supported by a base flange 10 to which in turn vessel 1 is attached by way of bottom flange 12 by means not shown. Baffles 14 are vertically disposed on the inner surface of vessel 1. Seal 11 is provided to prevent leakage at the rotating shaft entrance into the disperser zone. Each impeller disk is attached to the shaft as by a hub 15 and a setscrew 16 may be used to fix the disk at the desired position on the shaft. The disperser may be jacketed to permit maintenance of the desired temperature therein by circulating heating or cooling medium.

The impeller disks should have adequate thickness to withstand the mechanical strains incidental to operation of the apparatus. Their diameter should be such as to cover the greater part of the horizontal cross-sectional area of the disperser vessel, but they must clear any necessary obstructions such as presented by baffles which are much to be preferred in this apparatus. The diameter of the impeller disks should be not less than 75% of the inside diameter of the cylindrical disperser vessel and preferably at least 85%. The middle impeller must have openings within its surface area to permit passage of the mixture undergoing dispersion through the disk. The openings must not be too small otherwise they will not permit easy travel of liquid in either direction and each opening should be at least equal to one percent of the total disk surface and preferably it should be at least 5%. The combined area of all the openings should be equal to at least 10% of the disk area and may be up to about 90% of such area. The end disks must be substantially free of any openings but there may be more than one impeller disk between the end disks. However, all the middle disks must have perforations or openings as described as these openings provide for the circulation of liquid mixture throughout the space defined vertically by the solid end disks. It is preferable that all impeller disks in the disperser have the same diameter. Space between the disks can vary as a function of the disk diameter but is preferably within the range of 0.5 to 1.5 of the disk diameter. Rate of rotation of the impeller disks will depend upon process variables, such as viscosity of the mixture. For many mixtures a rotation range of 1500 to 3500 r.p.m. will be suitable.

The inlet for the disperser liquid, such as water, must be located at a point between the two end impellers and preferably is so located as to introduce the liquid at the level of the middle or perforated impeller. The outlet for the dispersion must be located at a point below the bottom impeller disk and must be provided with means that will maintain the dispersion height at about the level of the upper or top impeller disk. The rate of removal of dispersion will in general be determined by the rate at which liquid is fed into the disperser.

The particulate solid to be dispersed is fed into the disperser from the top and preferably falls as a continuous stream directly on the rotating upper end disk impeller.

This invention is in no way limited or dependent upon any theory of action but it is believed that the disperser is so highly effective because the dispersing action is due to the shearing forces which are produced at the disk impeller surfaces and this is in contrast to paddle or propeller type of dispersers in which there is a tendency to press particles together and form lumps or agglomerates.

By way of example when polyvinyl alcohol is to be dissolved in water it has been found that the present disperser can be used very effectively in first preparing a slurry of the polyvinyl alcohol in water and then holding the dispersion or slurry in another vessel with minimum agitation and with or without heating the dispersion until the slurry of polyvinyl alcohol has dissolved in the water.

Dry polyvinyl alcohol in particulate form is fed at the desired constant, preferably metered, rate into the top of apparatus at 7 and drops on the top impeller disk 3. The disk assembly rotates at a speed to maintain a smooth vortex in the space above the upper disk such as to leave about ¾ of the disk surface exposed and liquid-free. The dry solid should be directed onto the dry disk area in the vortex. Rotation will impel the solid substantially horizontally into the liquid medium which, due to the general flow, will carry the solid into the disperser zone proper between the top and bottom disks 3, and thence out of the disperser by way of 6. Water is fed into the disperser at 5 at such a rate that the desired slurry concentration will be formed. The average residence time of the mixture in the disperser will vary from about 1 to 5 minutes for concentrations of solid in water varying between about 6 to 14% by weight and a feed rate of 1 to 5 pounds per minute of dry polyvinyl alcohol. The slurry leaving the disperser will then require different hold-up times in a second vessel in which complete solution takes place. This last operation may require between ½ to 2 hours depending upon the particle size of the solid in the dispersion and the type of polyvinyl alcohol used.

Other more conventional methods heretofore used for dissolving polyvinyl alcohol in water have required four and more times as long and even then the solutions required filtration to remove large lumps of material the solution of which for economic reasons could not be awaited.

I claim:

1. In an apparatus for making a dispersion in a liquid, the combination comprising a vertically disposed cylindrical vessel open at the top, a rotatable shaft axially disposed in said vessel, at least three impeller disks mounted on said shaft in spaced relation to each other, all of said disks having substantially the same diameter, the two end disks being free of any openings and each disk between said end disks having more than one perforation such that the combined area of said perforations is at least 10% of the exposed surface area of the disk, means for rotating said impeller disks, inlet means for introducing liquid disperser medium into said vessel at a point between the end disks, and exit means below the bottom impeller disk for the discharge of the dispersion.

2. An apparatus for making a dispersion in a liquid comprising a vertical cylindrical disperser open at the top, a series of at least three impeller disks mounted in spaced relation to each other on a vertical shaft axially disposed in said disperser and adapted to rotate said disks, the two end impeller disks being free of any openings and each disk between said end disks having perforations such that each perforation comprises at least 1% of the exposed surface area of the disk and the total area of the perforations comprises at least 10% of said area, said disks all having substantially the same diameter which is at least equal to 75% of the internal diameter of said cylindrical disperser, a side inlet for introducing liquid disperser medium into said disperser between the end impeller disks, and an outlet for the dispersion below the bottom impeller disk.

3. An apparatus for making a dispersion in a liquid comprising a vertical cylindrical vessel open at the top, vertically disposed baffles attached to the interior surface of said vessel, a vertical rotatable shaft axially disposed in said vessel, at least three disk impellers mounted on said shaft in spaced relation to each other, the two end impeller disks being free of any openings and each disk between said end disks having perforations such that each perforation comprises at least 1% of the exposed surface area of the disk and the total area of the perforations comprises at least 10% of said area, said disks all having substantially the same diameter which is smaller than the diameter of the interior of said vessel so as to permit rotation of the disks without contacting said vertical baffles, a side inlet for admitting the liquid disperser medium into said vessel between the end impeller disks, and an exit for the dispersion below the bottom impeller disk.

References Cited in the file of this patent

UNITED STATES PATENTS

| 1,004,305 | Simpson | Sept. 26, 1911 |
| 1,524,651 | Hapgood | Feb. 3, 1925 |
| 1,993,446 | Huff | Mar. 5, 1935 |
| 2,008,684 | Craddock | July 23, 1935 |
| 2,074,673 | Sackett | Mar. 23, 1937 |
| 2,361,503 | Schutte et al. | Oct. 31, 1944 |
| 2,513,382 | Turnbow et al. | July 4, 1950 |
| 2,577,095 | Walker | Dec. 4, 1951 |
| 2,626,135 | Serner | Jan. 20, 1953 |
| 2,626,786 | McGlothlin | Jan. 27, 1953 |
| 2,640,816 | Germain | June 2, 1953 |
| 2,734,040 | Jones et al. | Feb. 7, 1956 |
| 2,793,166 | Hatch | May 21, 1957 |
| 2,805,051 | Miller | Sept. 3, 1957 |

FOREIGN PATENTS

| 695,384 | Germany | Aug. 23, 1940 |

OTHER REFERENCES

"Elvanol," polyvinyl alcohol, copyrighted 1953 by E. I. du Pont de Nemours and Co., page 25.